United States Patent [19]

Annas

[11] Patent Number: 4,645,867
[45] Date of Patent: Feb. 24, 1987

[54] GUY WIRE DEAD END ASSEMBLY

[75] Inventor: Nick S. Annas, Red Hook, N.Y.

[73] Assignee: Fargo Manufacturing Company, Inc., Poughkeepsie, N.Y.

[21] Appl. No.: 833,415

[22] Filed: Feb. 20, 1986

Related U.S. Application Data

[63] Continuation of Ser. No. 759,209, Feb. 10, 1984, abandoned.

[51] Int. Cl.$^4$ .............................................. H02G 15/02
[52] U.S. Cl. ....................................... 174/79; 248/63; 403/209; 403/213
[58] Field of Search .................. 174/79; 24/27, 115 G, 24/129 R, 277, 278; 403/88, 206, 209, 213; 248/63

[56] References Cited

U.S. PATENT DOCUMENTS

| | | | |
|---|---|---|---|
| 1,827,297 | 10/1931 | Moore | 174/94 R |
| 2,705,158 | 3/1955 | Risley | 24/277 |
| 2,775,747 | 12/1956 | Reischer et al. | 174/79 |
| 3,471,904 | 10/1969 | Aho | 174/79 |
| 3,551,960 | 1/1971 | Little | 24/123 |
| 3,561,071 | 2/1971 | Schein | 24/123 |
| 3,996,417 | 12/1976 | Annas | 174/79 X |
| 4,183,122 | 1/1980 | Wagner | 24/277 |
| 4,214,121 | 7/1980 | Charnoski et al. | 174/84 C |
| 4,453,034 | 6/1984 | Annas et al. | 174/79 |

FOREIGN PATENT DOCUMENTS

| | | | |
|---|---|---|---|
| 591040 | 4/1959 | Italy | 174/79 |
| 900667 | 7/1962 | United Kingdom | 174/79 |

OTHER PUBLICATIONS

Preformed Line Products brochure, Cleveland, Ohio, "Vari-Grip Dead-End".
Chance Literature, pp. 15-19, "Adjustable-Grip Deadends".

*Primary Examiner*—Arthur T. Grimley
*Assistant Examiner*—Morris H. Nimmo
*Attorney, Agent, or Firm*—Kane, Dalsimer, Kane, Sullivan & Kurucz

[57] ABSTRACT

A dead end assembly having a threaded U-bolt and a compression sleeve for coupling to the guy wire. A portion of the guy wire is inserted into the sleeve with the sleeve crimped thereabout. The sleeve is positioned adjacent a yoke which slides onto the bolt and is maintained by nuts screwed onto the ends of the bolt. These nuts may be threaded down allowing the yoke to be moved to provide a proper tensioning of the guy wire. A brace is provided along the U-bolt to act as a spacer and for added reinforcement of the legs of the bolt.

13 Claims, 4 Drawing Figures

GUY WIRE DEAD END ASSEMBLY

This is a continuation of application Ser. No. 759,209 filed Feb. 10, 1984, now abandoned.

FIELD OF THE INVENTION

The present invention is directed towards providing a dead end particularly one for use with a guy wire.

BACKGROUND OF THE INVENTION

In the electrical transmission field, the high tension lines that carry current are usually strung between support towers. These towers are constructed to maintain securely the wires and are of a somewhat complicated design.

It has become more desirable at this time to utilize single post support for the wires. This has obvious advantages over the tower i.e., reduced costs and construction. However, in order to secure the post in position it has been found desirable to anchor the posts by way of guy wires which are secured to stationary supports usually embedded in the ground. Dead ending the guy wire should not be too difficult a procedure since the size of the wire and the dead end are fairly large and as such could be cumbersome to work with.

SUMMARY OF THE INVENTION

Accordingly, it is a principal object of the present invention to provide a dead end for a guy wire which is relatively simple, yet effective in its implementation.

It is yet another object to provide for a dead end which inhibits corrosion in metallic guy anchors in which they are coupled, due to stray electric currents in the guy wires.

It is another object to provide for a dead end which securely fastens the guy wire to the anchor and is adjustable to allow for proper tensioning of the wire.

The present invention provides for a dead end having a threaded U-bolt and a compression sleeve for coupling to the guy wire. A portion of the guy wire is inserted into the sleeve with the sleeve crimped thereabout. The sleeve is positioned adjacent a yoke which slides onto the bolt insulated therefrom, and maintained by nuts screwed onto the ends of the bolt.

These nuts may be threaded down allowing the yoke to be moved to provide for a proper tensioning of the guy wire. A brace is provided along the U-bolt to act as a spacer and for added reinforcement of the legs of the bolt.

In addition, a somewhat tamper resistant element is provided so as to inhibit unauthorized tampering with the nuts.

BRIEF DESCRIPTION OF THE DRAWINGS

Thus by the aforenoted invention, its objects and advantages will be realized, the description of which should be taken in conjunction with the drawings wherein.

DETAILED DESCRIPTION OF THE PREFERRED EMBODIMENT

Figure 1:
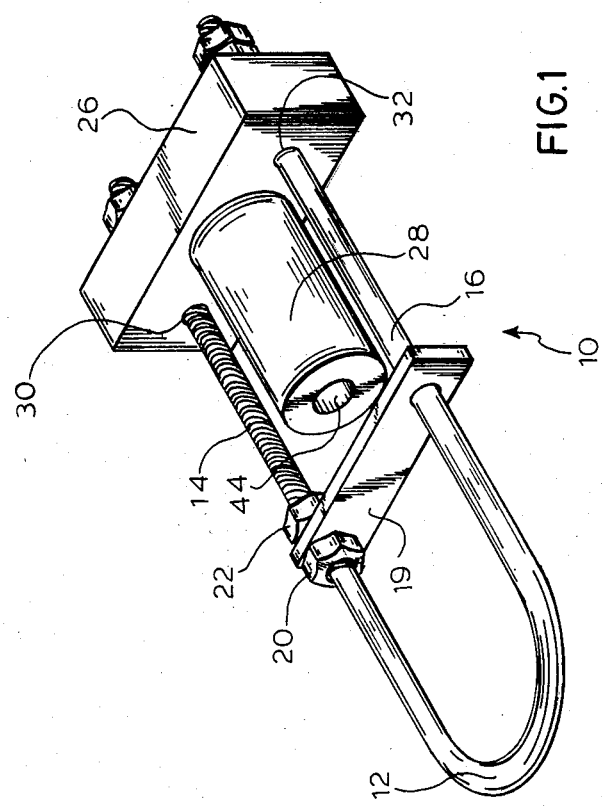
FIG. 1 is a perspective view of a first embodiment of a guy wire dead end assembly incorporating the teachings of the present invention.
Figure 2:
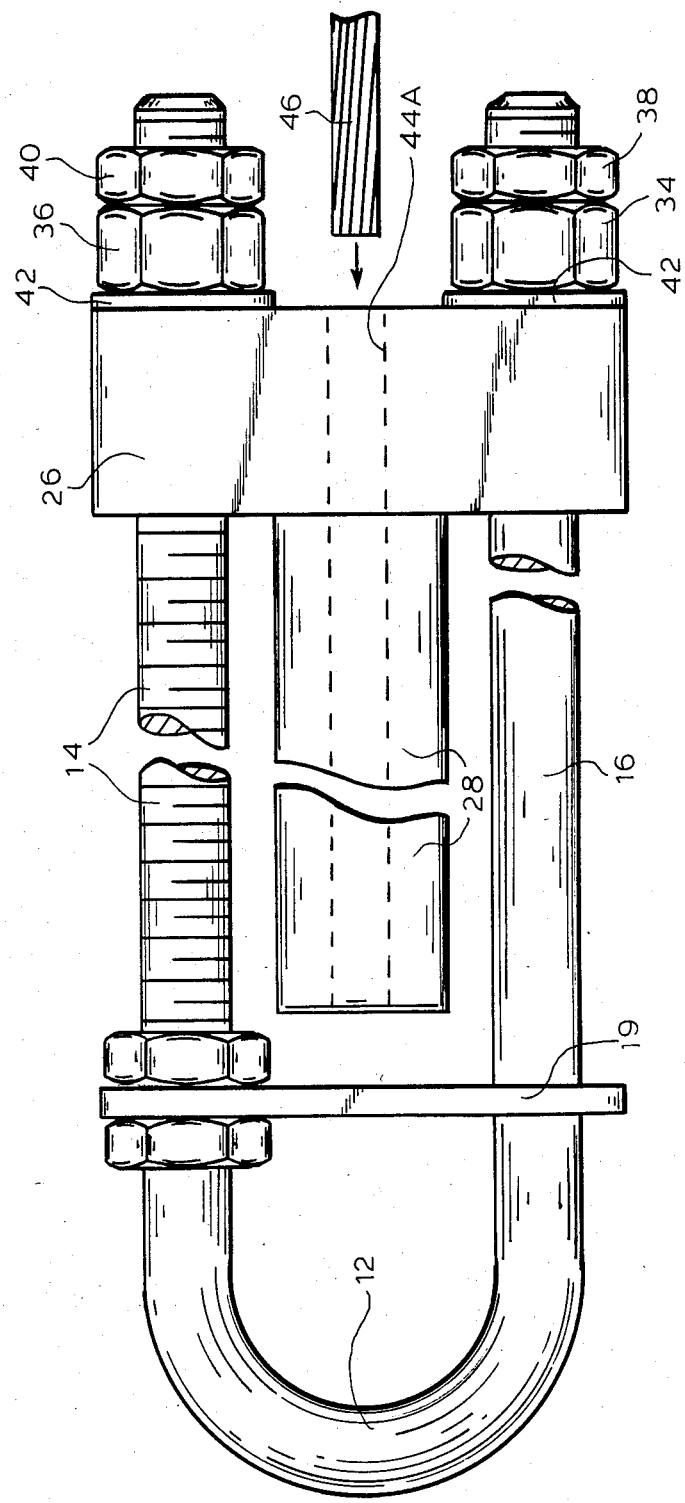
FIG. 2 is a top plan partially sectional view of the dead end assembly shown in FIG. 1.

With reference now more particularly to FIGS. 1 and 2, there is shown a guy wire dead end assembly 10 which is particularly useful in anchoring guy wires used with supporting pole structures for transmission lines etc. The dead end 10 includes a U-bolt 12 having legs designated 14 and 16 and is preferably manufactured out of steel. Note that since these dead ends are required to perform heavy anchoring services, they are relatively large with typical U-bolts being approximately 1⅓ feet in length with the diameter of each leg being almost an inch across.

Leg 14 is partially threaded having a brace 19 adjustably positioned thereon between two hex jam nuts 22, 24. The brace 19 includes a rectangular member having two openings positioned with respect to legs 14 and 16. Brace 19 may be made of aluminum and rather than two openings as shown, a single opening and open slot may be utilized so as to allow the brace to pivot hingingly about the opening.

Brace 19 acts as a spacer, increases the strength of the assembly and defines an anchor eye for coupling the dead end with a stationary anchor. The thread nut relation allows an adjustment of brace 19 by adjusting the position of the nuts 22, 24 along leg 14.

Positioned at the lower end of the U-bolt 12 is a rectangular yoke 26 and a cylindrical hollow compression sleeve 28, both of which may be made of aluminum.

The yoke 26 includes openings 30 and 32, which are sufficient size to slide over the ends of legs 14 and 16 respectively, with the legs passing therethrough. The ends of the legs 14 and 16 are threaded to allow the screwing of hex nuts 34 and 36 along with hex jam nuts 38 and 40 therebehind. Interposed between the nuts and the yoke 26 are washers 42. Adjacent the yoke 26 is the compression sleeve 28 having a bore 44 therethrough coaxial with a bore 44A (shown in phantom and somewhat larger than the diameter of guy wire 46) in the yoke 26. This allows the insertion therethrough of the guy wire 46 to be anchored.

Note that bore 44 is also somewhat larger than the diameter of the guy wire and is typically coated with a grit coating i.e., aluminum oxide 150, which facilitates a strong gripping action of the sleeve 28 during crimping. In this regard, once the guy is inserted into the bore 44A and 44, a portion of which may extend therethrough, the sleeve may be crimped in a standard manner usually with a hydraulic press. If it is desired to make the sleeve 28 separate from the yoke 26, the guy wire 46 should first be inserted through bore 44A prior to crimping the sleeve 28 about the guy wire. Of course, the outer diameter of the sleeve 28 should be of such a size that it abuts sufficient areas of the yoke 26 during a tightening down of the device. The yoke 26 may then be coupled with the U-bolt 12 after its coupling to the stationary anchor with the hex nuts tightened down. The tightening of the nuts 34–40 may be used to draw the guy wire into proper tensioning thereof.

Figure 3:
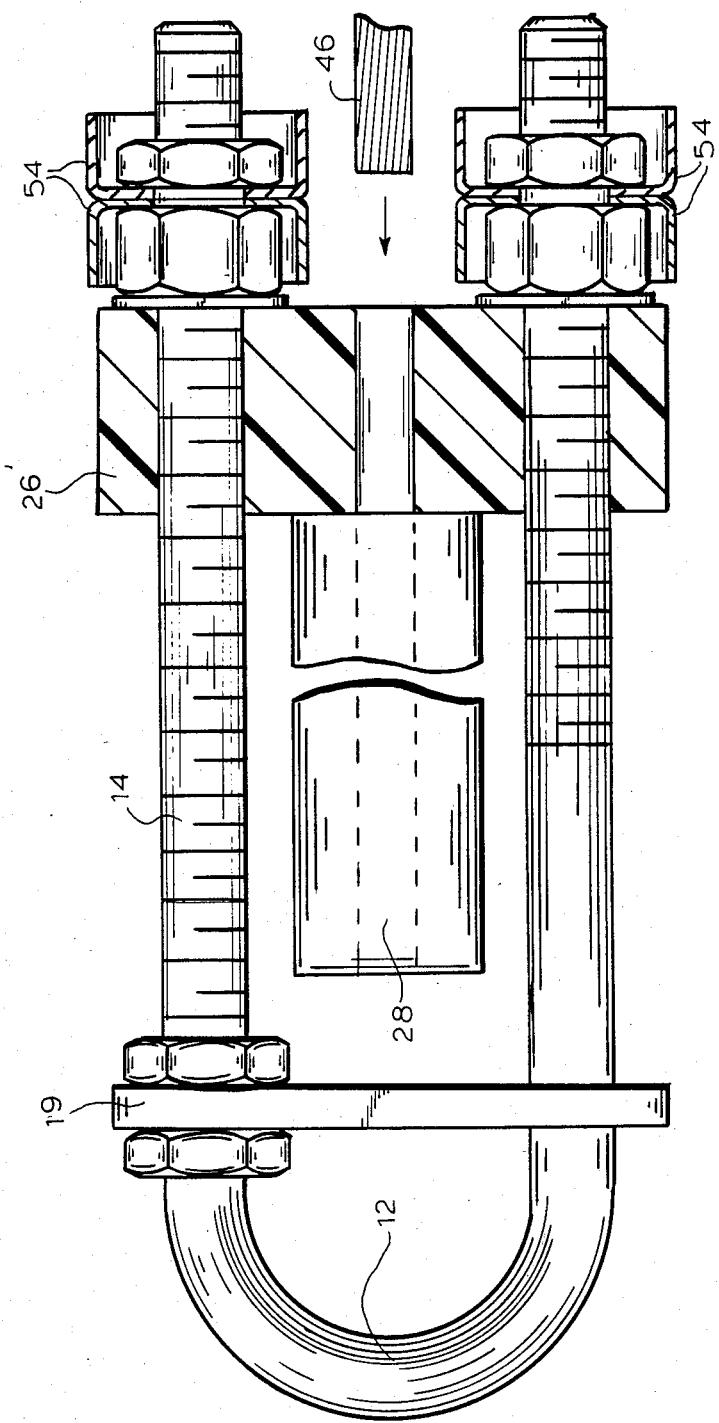
FIG. 3 is a top plan partially sectional view of a second embodiment of a dead end assembly incorporating the teachings of the present invention.

Note that if it is desired to provide for additional tensioning or increased adjustability of the assembly, especially in the larger size of dead ends, the threads along leg 16 may be extended an increased length thereof as shown in FIG. 3. This would allow an increased distance that the yoke 26 can be drawn up.

Furthermore, as is apparent, the dead end serves to secure a metal guy wire to a metallic guy anchor positioned in the ground, for example. Stray currents in the guy wire 46 transferred to the dead end and in turn to the metallic anchor are usually blamed for causing galvonic corrosion of earth anchors.

In this regard, as shown in FIG. 3, the yoke 26' may be fabricated out of high strength dielectric material suitable for purpose to act as an insulator which prevents the passing of stray current from the guy wire to the anchor.

Figure 4:
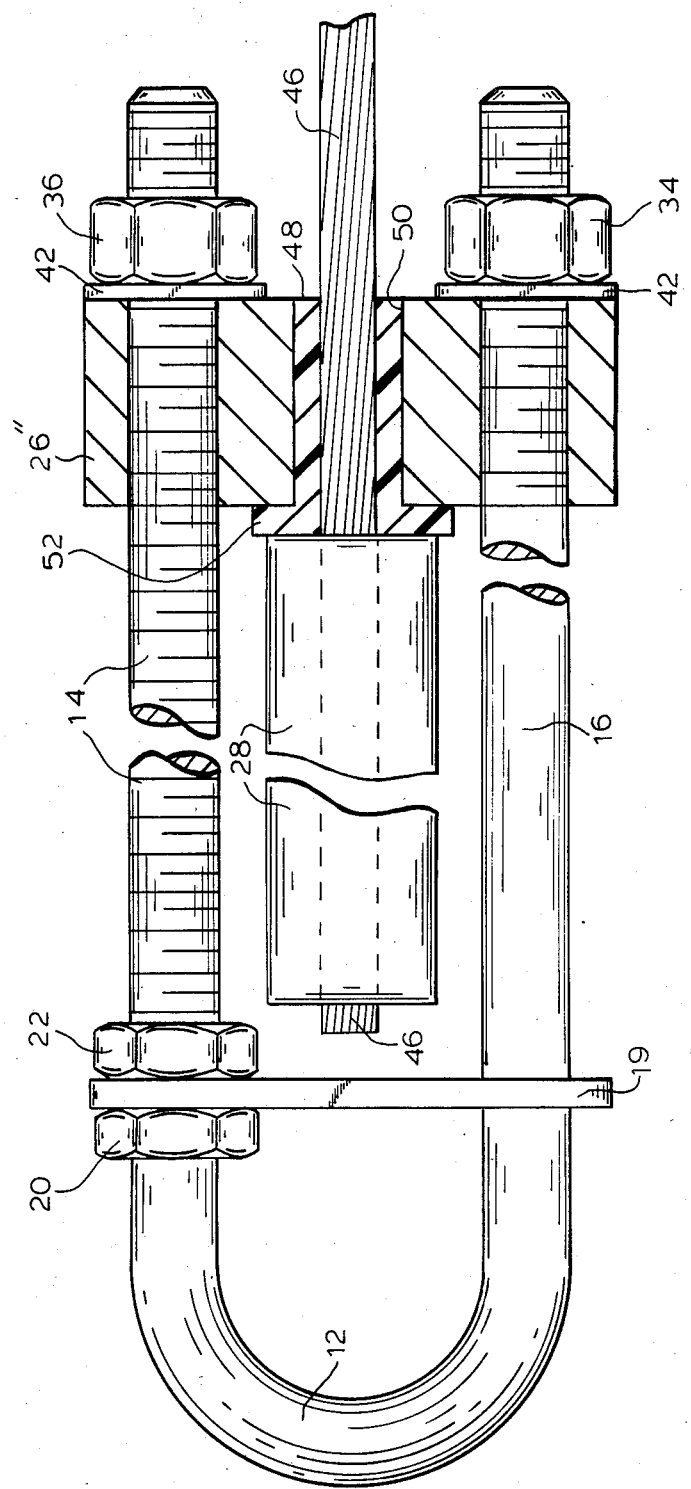
FIG. 4 is a top plan partial view of a third embodiment of a dead end assembly incorporating the teachings of the present invention.

Alternatively, as shown in FIG. 4, a hollow cylindrical dielectric insert 48 may be interposed between yoke 26'' and guy wire 46 in a bore 50. Lip 52 serves to insulate compression sleeve 28 from the yoke 26'' preventing the passing of stray current thereto. Thus by either of the aforenoted means, the anchor to which the dead end is coupled is protected from corrosion by stray currents.

In addition, the yoke may be insulated from the U-bolt via dielectric inserts interposed in openings 30 and 32 and positioned between the hex nuts and yoke with similar results.

As shown in FIG. 3, the nuts 34–40 may be provided with fastener guards 54 for the respective nuts so as to inhibit the unauthorized loosening of the nuts. These fastener guards comprise cylindrical member open at one end with a bore through the opposite end slightly larger than the diameter of the legs 14 and 16. These guards slide over the legs in back to back fashion thereby limiting access to only the rear nuts 38 and 40 through the open end of the fastener guards.

Thus, by the aforenoted invention, its objects and advantages are realized, and although preferred embodiments have been disclosed and described in detail herein, its scope should not be limited thereby, rather its scope should be determined by that of the appended claims.

What is claimed is:

1. A dead end assembly for use in association with a guy wire and the like for dead ending thereof, said assembly comprising:

substantially U-shaped U-bolt member adapted to engage an anchor at the U-portion of the U-bolt member with said bolt having legs which include threaded end portions;

yoke means having first and second openings to allow the passing through thereof of said respective threaded end portions and a third opening therethrough to allow a guy wire to pass freely therethrough;

a cylindrical compression sleeve having an axial bore therethrough adapted to receive a guy wire and said sleeve being of a crimpable material adapted to fixedly engage a guy wire independently of said yoke such that the integrity of the yoke means is not compromised to accommodate the compression sleeve upon the crimping of said sleeve and said compression sleeve being positioned adjacent to and in abutting engagement with said yoke means whereupon movement of the yoke means causes corresponding movement of said sleeve and a compression and column loading by said sleeve on said yoke results; and nut means screw threaded on said end portion so as to capture said yoke means on the U-bolt member and prevent removal therefrom and upon a threading down of said nut means causes a drawing up of the yoke means and accordingly the compression sleeve which fixedly engages a guy wire causing a tensioning thereof when said U-portion is engaging an anchor.

2. The assembly in accordance with claim 1 wherein said axial bore includes grit on the surface of the bore.

3. The assembly in accordance with claim 2 wherein said yoke means includes a third opening sized so as to allow the passage of a guy wire therethrough, positioned between said first and second openings, and said bore in the sleeve being positioned axially with said third opening.

4. The assembly in accordance with claim 3 wherein said sleeve and said yoke means are formed out of a metallic material.

5. The assembly in accordance with claim 4 which further includes a brace means adjustably engaging the respective legs of the U-bolt member at a position removed from said yoke means.

6. The assembly in accordance with claim 5 which includes at least one leg having an extended threaded portion on which said brace is movably positioned by the screwing of nuts positioned axially on either side thereof.

7. The assembly in accordance with claim 6 which includes fastener guard means which inhibits removal of said nut means.

8. The assembly in accordance with claim 3 which further includes insulator means insulating the anchor from electric current in a guy wire.

9. The assembly in accordance with claim 8 wherein said insulator means includes a hollow dielectric insert positioned in said third opening interposed between a guy wire passing therethrough and said sleeve and yoke means.

10. The assembly in accordance with claim 1 which further includes a brace means adjustably engaging the respective legs of the U-bolt member at a position removed from said yoke means.

11. The assembly in accordance with claim 10 which includes at least one leg having an extended threaded portion on which said brace is movably positioned by the screwing of nuts positioned axially on either side of the brace.

12. The assembly in accordance with claim 1 which includes fastener guard means which inhibits removal of said nut means.

13. The assembly in accordance with claim 8 wherein said insulator means comprises a yoke fabricated out of an insulating material.

* * * * *